(12) United States Patent
Egashira (10) Patent No.: US 6,985,114 B2
(45) Date of Patent: Jan. 10, 2006

(54) MULTI-FREQUENCY ANTENNA AND CONSTITUTING METHOD THEREOF (75) Inventor: Yoshimi Egashira, Sagamihara (JP)

(73) Assignee: Houkou Electric Co., Ltd., Yokohama (JP)

( * ) Notice: Subject to any disclaimer, the term of this patent is extended or adjusted under 35 U.S.C. 154(b) by 24 days.

(21) Appl. No.: 10/836,203

(22) Filed: May 3, 2004

(65) Prior Publication Data
US 2004/0246188 A1 Dec. 9, 2004

(30) Foreign Application Priority Data
Jun. 9, 2003 (JP) .............................. 2003-163904
Nov. 5, 2003 (JP) .............................. 2003-375916

(51) Int. Cl.
H01Q 1/24 (2006.01)
(52) U.S. Cl. .............................. 343/702; 343/700 MS; 343/860; 29/600
(58) Field of Classification Search ................ 343/702, 343/860, 700 MS; 29/600; 455/550.1; H01Q 1/24
See application file for complete search history.

(56) References Cited
U.S. PATENT DOCUMENTS 6,184,845 B1 * 2/2001 Leisten et al. ............... 343/895
6,208,311 B1 * 3/2001 Reece et al. ................. 343/795
6,362,793 B1 * 3/2002 Sawamura et al. .......... 343/702
6,690,336 B1 * 2/2004 Leisten et al. ............... 343/895
6,762,729 B2 * 7/2004 Egashira ...................... 343/767
2004/0253972 A1 * 12/2004 Iwai et al. ................. 455/550.1

* cited by examiner

Primary Examiner—Trinh V Dinh
Assistant Examiner—Binh Van Ho
(74) Attorney, Agent, or Firm—Bacon & Thomas PLLC (57) ABSTRACT A multi-frequency antenna having a small size, light weight and excellent productivity and being suitable for transmitting and receiving electric waves in $Gh_z$ band, is constituted such that an orthogonal coordinate X-Y is set, a first antenna element 21 having an electric wavelength of $\lambda_a/4$ and a second antenna element 22 having an electric wavelength of $\lambda_b/4$ are placed in parallel to the X axis respectively, one edge of each of said elements is positioned near the Y axis, said two elements are connected electrically with a ground plate 8 by a short-circuit line 4 along the Y axis, a point where an impedance is 50 Ω (code 50) of the first antenna element 21 and a point where an impedance is 50 Ω of the second antenna element 22 are made to be a power feed point respectively, and said power feed points are connected with a coaxial cable 7 through a power feed line 6.

13 Claims, 11 Drawing Sheets

MULTI-FREQUENCY ANTENNA AND CONSTITUTING METHOD THEREOF

BACKGROUND OF THE INVENTION

1. Field of the Invention

The present invention relates to an antenna having a small size, light weight, and high gain, being improved to have a wide tuning frequency band, and being suitable for mounting on a personal computer for example, to constitute a wireless LAN, i.e., Local Area Network.

2. Description of the Conventional Art

As a technology relating to the antenna having the small size and light weight, which is used for a terminal station of the wireless LAN or a portable type electronic equipment, "Non-direction antenna system and Notebook personal computer" described in Japanese Patent Laid Open No. 2001-345619 has been publicly known.

Figure 1:
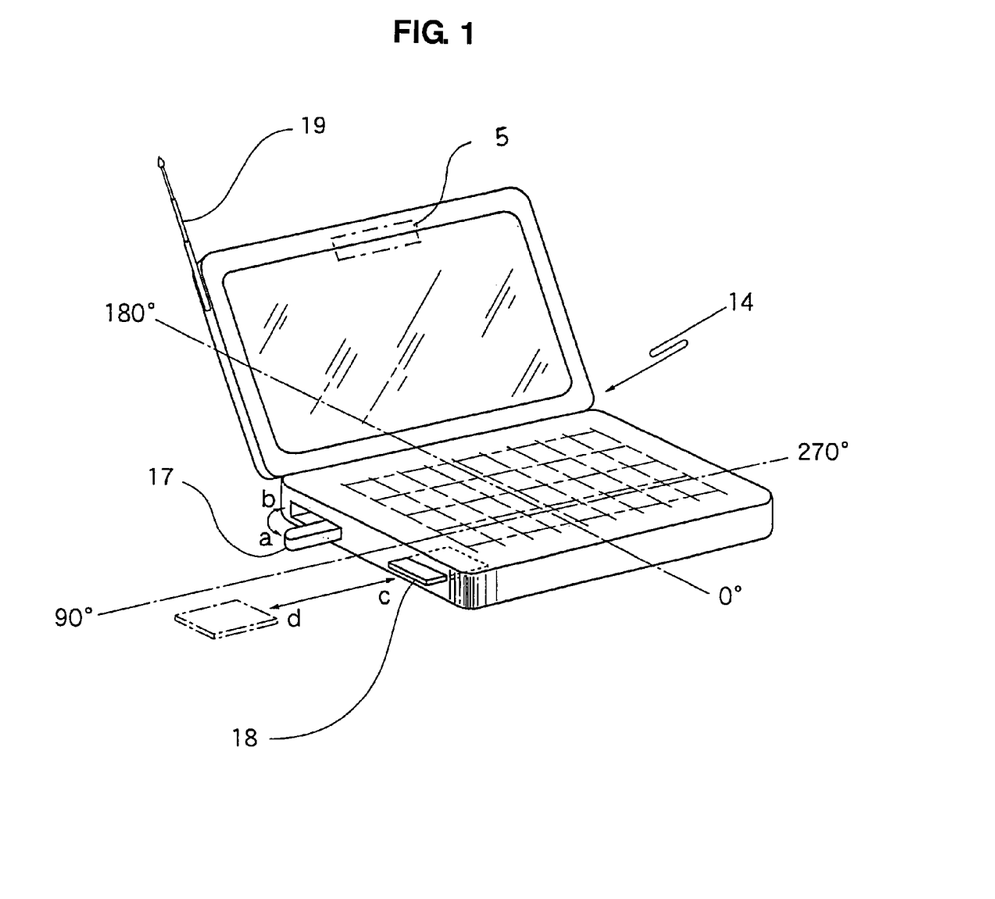
FIG. 1 is an appearance perspective view of the personal computer 14 mounting the small sized antennas of the conventional examples, wherein a mounting position of the antenna of the present invention is written in addition with the virtual line (chain line).

In FIG. 1, three kinds of the publicly known antenna being proposed for mounting on the personal computer are drawn in one figure. (In actual use, only one of the three antennas is installed.)

A code 17 shows a foldable antenna. This antenna can be used by setting up as shown with an arrow a, and can be housed as shown with an arrow b.

A code 18 shows a PC card having an antenna, and this PC card is inserted into a main body of a personal computer 14 as shown with an arrow c. As for this PC card, the edge is projected a little in the inserted state as shown with a solid line, and the antenna is prepared at this projection part.

A code 19 shows a rod antenna, and can be telescopically extended and contracted.

These three antennas shown in FIG. 1 have merits and demerits respectively, and are not perfect.

The fordable antenna 17 must be raised and lowered by a fingertip at the time of starting and ending of use, thus it is troublesome.

As for the PC card having the antenna 18 and the rod antenna 19, since an antenna element is projected from the main body of the personal computer 14, there is a problem for this element being caught if not taking care.

Further, the foldable antenna 17 and the PC card 18 having the antenna are influenced by the main body of the personal computer 14, thus there are problems that an antenna gain in 270 degree direction in the figure is inferior as compared with the antenna gain in 90 degree direction.

In addition, these three antennas are visible in appearance to damage a value in a design, thus the commodity value is decreased.

Furthermore, these publicly known antennas are tuned only at a specific frequency band, and have not a multi-frequency property (a dual band property). Thereby, for example, when the transmitting and receiving by the diversity system are carried out, it is necessary to prepare two sets of the antenna.

The present invention was carried out in order to solve the above problems, and has an object to provide a new technology of an antenna having the remarkably small size, the light weight and especially a ultra-thin, wherein an hand operation, such as extension and contraction, raising and lowering, or the like, is not necessity at the time of starting and ending of the use, and an antenna gain is high. Further, this antenna technology is suitable for an industrially mass-producing with a low production cost. In addition, in this antenna technology, the antenna is not projected from the instrument for mounting, thus the value in the design is not damaged.

If such the antenna device is developed, the antenna can be housed and set in a backside of a liquid crystal display or a plastic frame in the personal computer 14, for example, like an antenna 5 shown with a virtual line (chain line) in FIG. 1.

SUMMARY OF THE INVENTION

For achieving the above object, in the present invention, a T-shaped antenna and a F-shaped antenna, which are publicly known, are improved, and a new deformed T-shaped antenna and a new deformed F-shaped antenna are made. An antenna performance can be improved further by adding a parasitic element to these new antennas.

The deformed T-shaped antenna, the deformed F-shaped antenna, and the non-power feed element added to these antennas can be made, for example, by cutting out a copper thin plate or making a conductive pattern of a board, and can be made to have the ultra-thin constitution by any of the methods, wherein the copper thin plate includes not only copper foils but also thin plates having about 0.1 mm thickness.

Furthermore, when a flexible board is used as the improved method of using the board, this flexible board can be easily inserted between constitution members of an electronic instrument (for example, the personal computer) (refer to an antenna 5 in FIG. 1).

BRIEF EXPLANATION OF THE DRAWINGS

FIG. 5 is diagrams, wherein the antenna characteristics of the example shown in FIG. 3 are explained by corresponding to the working frequency band in each country, and (A) is a diagram of a return loss characteristic, and (B) is a diagram of VSWR (voltage standing wave ratio).

DETAILED DESCRIPTION OF PREFERRED EMBODIMENT

Hereinafter, the preferred embodiment of the present invention is explained by referring to the attached drawings.

A part added with spots in the drawings (refer to FIG. 2) is an electro-conductive thin plate (which is the same in FIG. 3 and FIG. 6 to FIG. 11).

Figure 2:
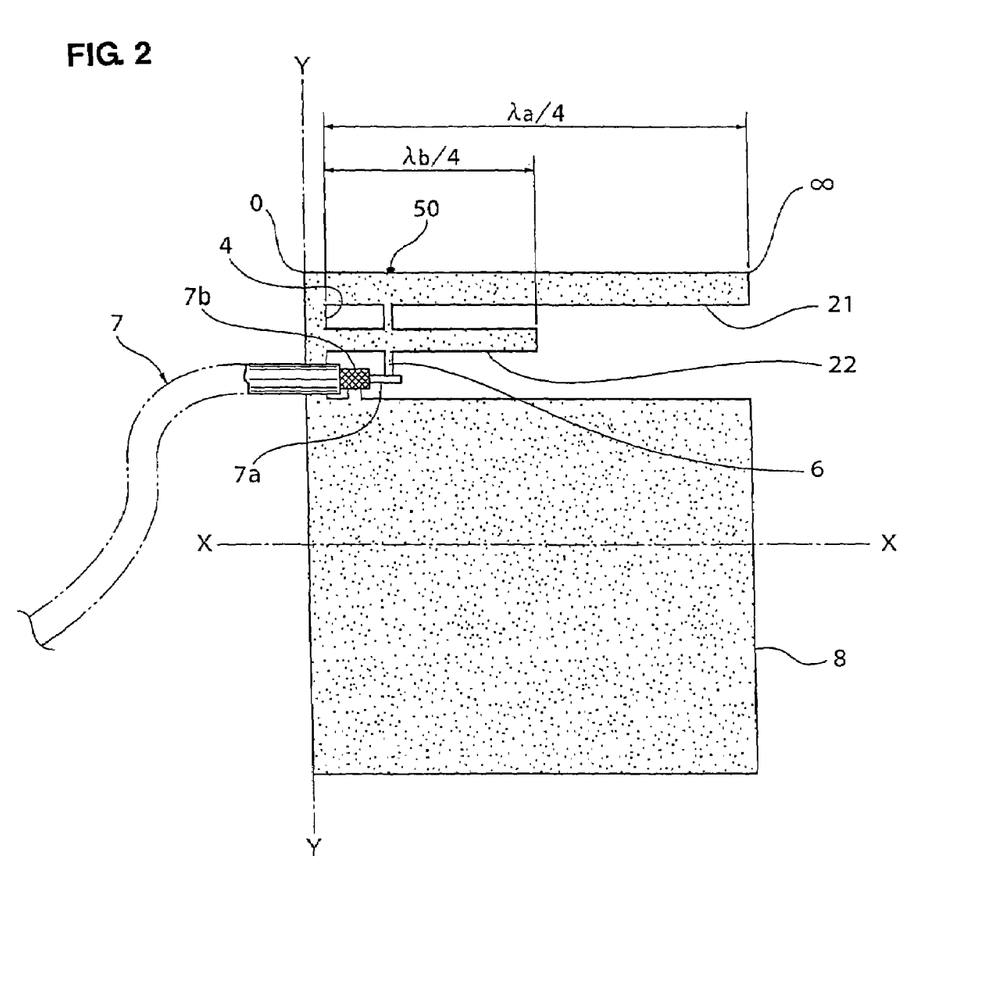
FIG. 2 is a schematic front view drawing the antenna of examples corresponding to claim 1 and claim 9.

In this figure, the example was made by cutting out a copper thin plate. However, when this plate is mass-produced industrially, it is desirably to form by making the conductive pattern of the board. When this antenna is constituted in such way, a lot of products having high accuracy and a uniform quality can be obtained with a low cost.

In this example, the antenna capable of transmitting and receiving two kinds of the wavelengths of $\lambda_a$ and $\lambda_b$ is constituted by applying the present invention, and this example is corresponding to claim 1 and claim 9.

The antenna is constituted in a method such that, setting an orthogonal coordinate X-Y, arranging the first antenna element 21 having an electric length of $\lambda_a/4$ in parallel to the X-axis, with positioning the one edge thereof near the Y-axis, arranging the second antenna element 22 having an electric length of $\lambda_b/4$ in parallel to the X-axis with positioning the one edge thereof near the Y-axis, like the above, and connecting electrically a part near the one edge of the first antenna element 21, a part near the one edge of the second antenna element 22 and a ground plate 8, with a short-circuit line 4 in the Y-axis direction.

When the first antenna element 21 is considered, an impedance is infinite at an edge being not connected electrically with the ground plate 8, (as shown by adding a code ∞).

Moreover, the impedance is zero at the part near the edge being connected electrically with the ground plate 8, (as shown by adding a code 0).

More particularly, there is a point of impedance being 50 Ω (which is shown by a code 50) between the point ∞ and the point 0, (a little to the point 0).

Although a code is omitted, there is the point of impedance being 50 Ω also in the second antenna element 22.

The points of impedance being 50 Ω of each antenna element are connected each other by a power feed line 6, and a center conductor 7a of a coaxial cable 7 is connected electrically with this power feed line 6.

An external conductor 7b of the coaxial cable 7 is connected electrically with the ground plate 8.

Figure 3:
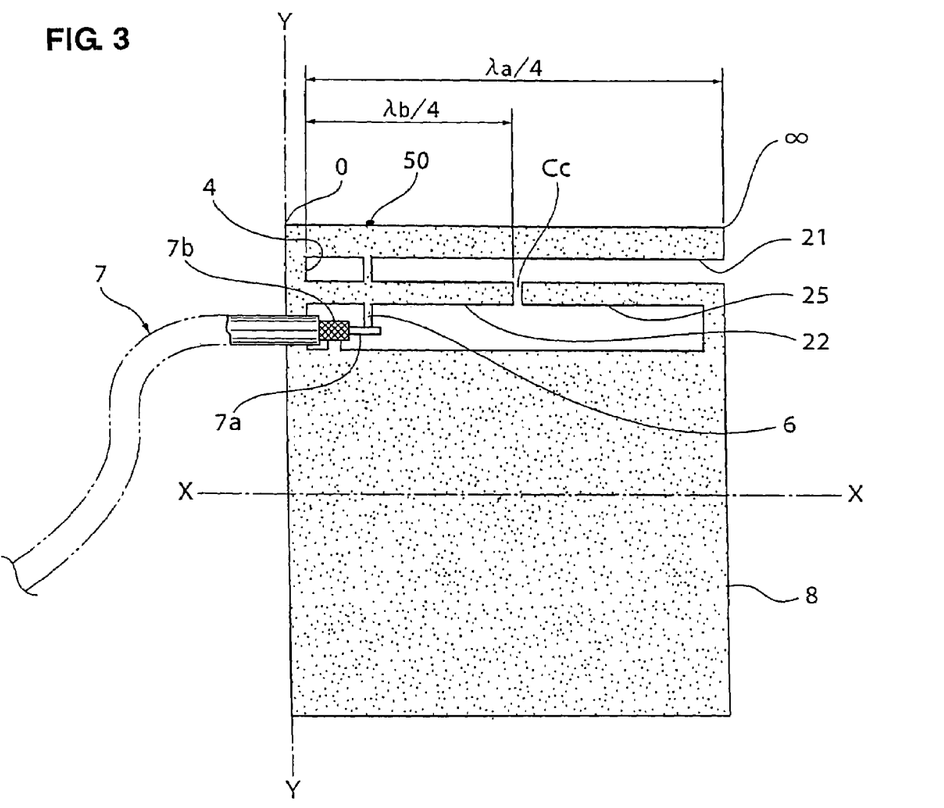
FIG. 3 is a schematic front view drawing the antenna of examples corresponding to claim 2 and claim 11.

FIG. 3 is an improved example of the example in FIG. 2, and corresponding to claim 2 and claim 3.

The difference between FIG. 3 and FIG. 2 is that, arranging a second parasitic element 25 having the electric length of $\lambda_b/4$ opposite to and apart from a tip edge, which is the point of the impedance being ∞, of the second antenna element 22 having the electric length of $\lambda_b/4$, and connecting electrically the other edge of the second parasitic element 25 with the ground plate 8.

Thereby, an electrostatic capacitance Cc is formed between the second antenna element 22 and the second parasitic element 25.

In a high frequency wave of GHz band like the present invention, it must be understood that a coupling state between the elements 22 and 25 is not a pure electrostatic capacitance coupling but an electromagnetic field coupling.

When the second parasitic element 25 being explained in the above is made, a double resonance phenomenon is generated by the electromagnetic field coupling between the second antenna element 22 and the second parasitic element 25, and a tuning frequency bandwidth to an electric wave having the wavelength of $\lambda_b$ is expanded.

Figure 4:
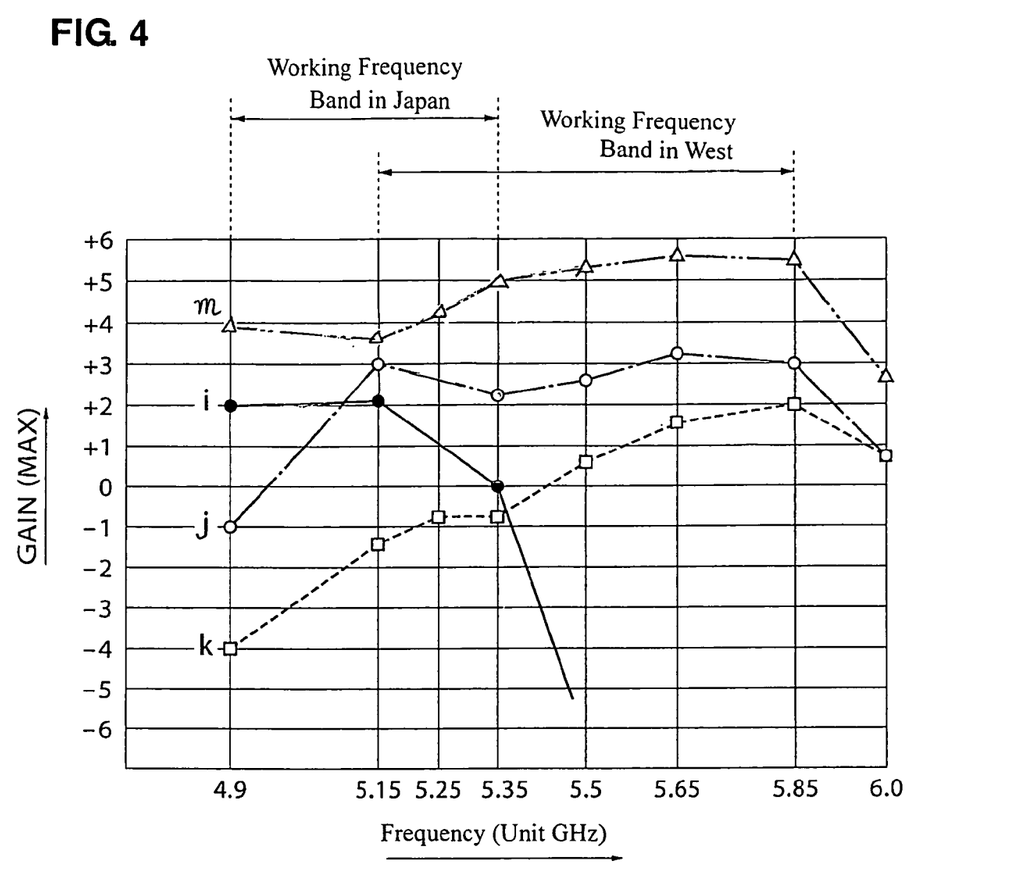
FIG. 4 is a diagram drawing various antenna gains in working frequency bands in the major countries in the world.

FIG. 4 is the diagram of the antenna characteristics, which is drawn by comparing the example and the conventional example. In this diagram, the frequency (GHz) is set up on the horizontal axis, and "the maximum gain within the horizontal plane by the vertical polarization" is set up on the vertical axis. In addition, the frequency band used for the wireless LAN of the personal computers is written in addition by dividing into the Japanese type and Western type.

A curve i drawn with the solid line is a characteristic curve of the antenna of the conventional example, which is constituted according to the Japanese specification. Although the frequency band of the Japanese specification is covered, the frequency band of the Western specification is not covered.

A curve k drawn with dashed lines is the characteristic curve of the antenna of the conventional example, which is constituted according to the Western specification. Although the frequency band of the Western specification is covered, the frequency band of the Japanese specification is not covered.

A curve j drawn with one-dot chain lines is a characteristic in the example in FIG. 2. The high gain being the effects of claim 1 and claim 9 is shown.

A curve m drawn with two-dots chain lines is a characteristic in the example in FIG. 3. A broadband performance being the effects of claim 2 and claim 11 is shown, and the frequency bands of the Japanese specification and the Western specification are completely cleared.

Figure 5A:
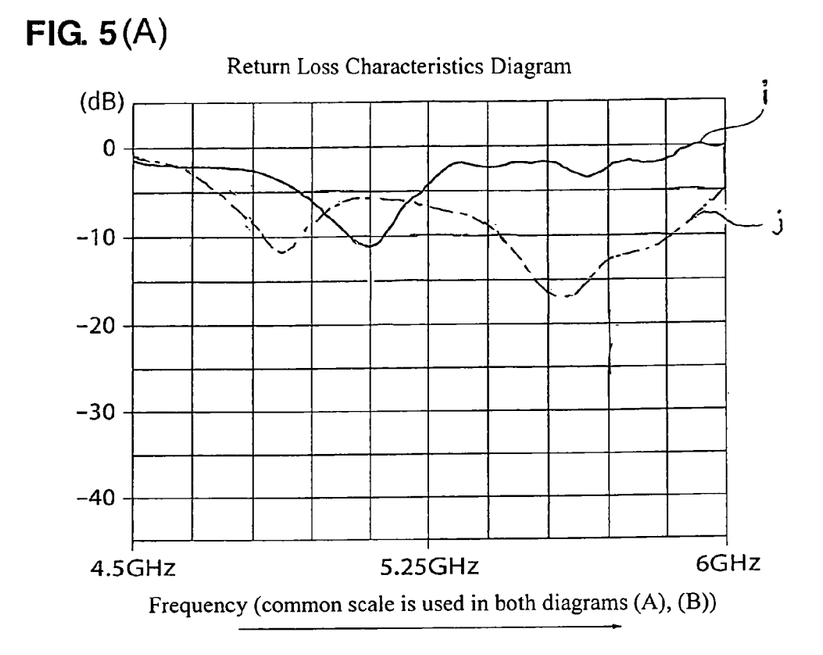
Figure 5B:
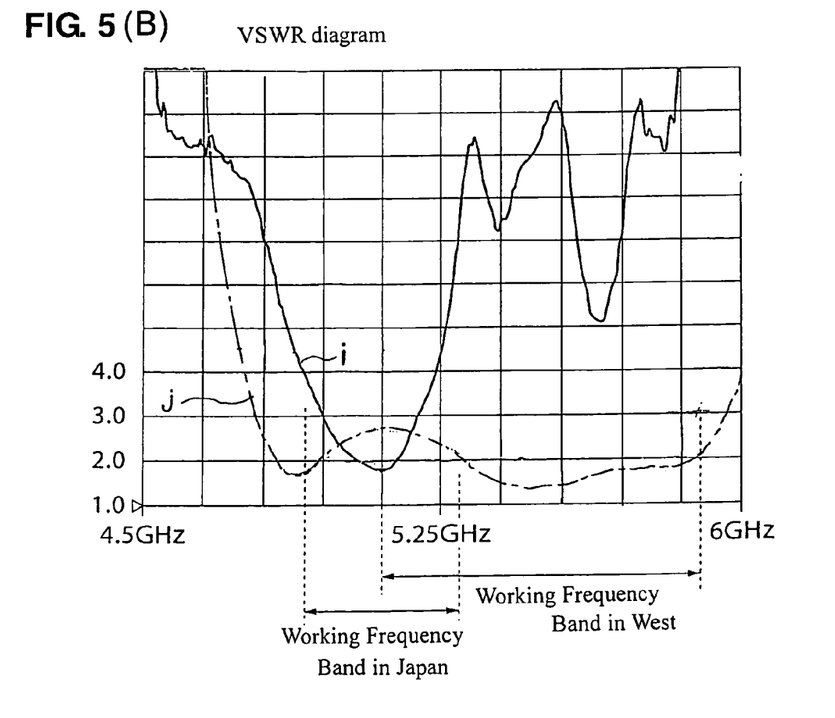

FIG. 5 is the diagram of the antenna characteristics, which is drawn by comparing the example and the conventional example. In this diagram, the frequency (GHz) is set up on the horizontal axis, and "the maximum gain within the horizontal plane by the vertical polarization" is set up on the vertical axis. The figure (A) shows the return loss characteristic, and (B) shows VSWR (voltage standing wave ratio).

In addition, the scale of the horizontal axis is common for both (A) and (B), and the frequency band used for the wireless LAN of the personal computer is written in addition by dividing into the Japanese type and the Western type.

A curve i shows the characteristic of antenna of the conventional example being made according to the Japanese specification, and a curve j shows the example in FIG. 3.

Although a specific band of the curve i (conventional example) is about 6.9%, the specific band of the curve m (the example in FIG. 3) is about 22%, wherein these specific bands are observed in SWR3. So, it is understood that the tuning frequency band is remarkably expanded by adding the parasitic element.

Figure 6:
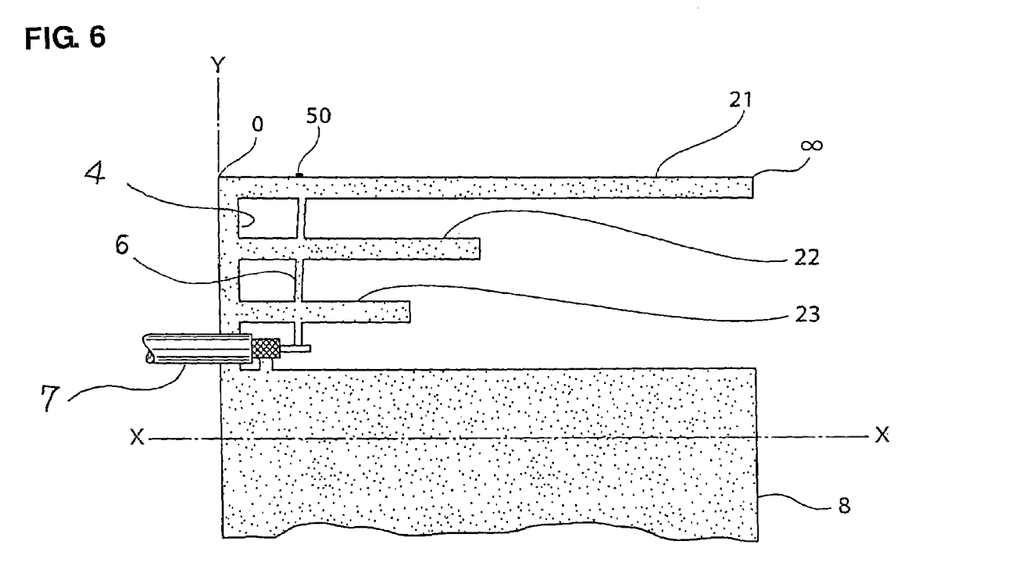
FIG. 6 is a schematic front view drawing an example corresponding to claim 10.

FIG. 6 shows a further different example and is corresponding to claim 10. Although the example in FIG. 2 is constituted so as to transmit and receive the electric waves having two kinds of the wavelength, the example in FIG. 6 is constituted so as to transmit and receive the electric waves having three kinds of the wavelength. The first antenna element 21 and the second antenna element 22, which are the same as them in FIG. 2, are prepared, and a third antenna element 23 having the electric length corresponding to ¼ of the wavelength of furthermore one kind of electric wave is further prepared.

The antenna having ¼ wavelength capable of transmitting and receiving the electric waves of n kinds of the wavelength can be constituted by following the example in FIG. 6.

Figure 7:
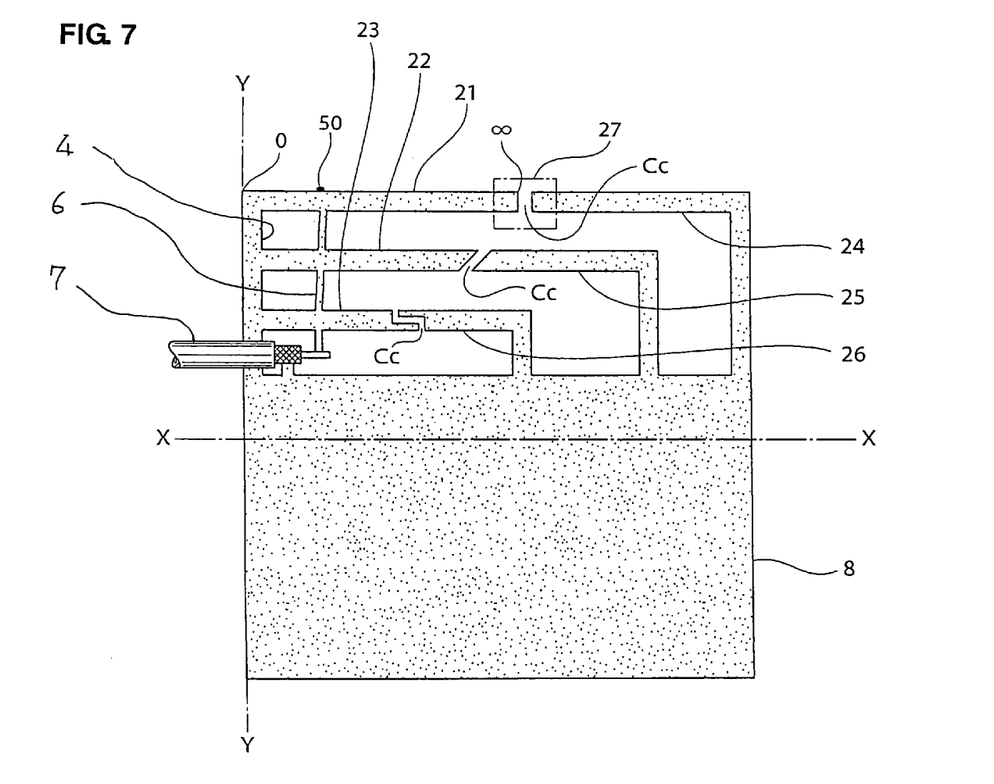
FIG. 7 is a schematic front view drawing examples corresponding to claim 2, claim 11 and claim 12.

FIG. 7 is the improved example of the example in FIG. 6, and corresponding to claim 11 and claim 12. However, since this figure is typically drawn, it is not a realistic projected figure.

The example in FIG. 7 is made based on the example in FIG. 6 as the following steps. That is,
arranging a first parasitic element 24 opposite to and apart from the first antenna element 21,
arranging a second parasitic element 25 opposite to and apart from the second antenna element 22, and
arranging a third parasitic element 26 opposite to and apart from the third antenna element 23.

By constituting in this way, the multi-frequency antenna having the larger tuning frequency band than that of the example in FIG. 6 can be made.

The electromagnetic field coupling is formed at the part where the antenna element and the parasitic element are opposed, and the antenna characteristic is changed with this coupling degree, (refer to FIG. 7).

If the coupling is dense, the tuning characteristic shows double-peaks, and if the coupling degree is non-dense, the tuning characteristic shows a single-peak. In the stage of a trial production development of the antenna device, the desired characteristic can be discovered by changing the density degree of the electromagnetic field coupling.

In order to make the coupling into non-dense, the opposed elements may be further separated. However, in order to make the coupling into dense, it may not become dense by only closing the interval distance. In this FIG. 7, three kinds of an idea for making the electromagnetic field coupling into dense are shown.

(A) The constitution part shown by adding spots is formed by the conductive pattern at the one side surface of the double-sided board, and around the part where the first antenna element 21 and the first parasitic element 24 are opposed, a backside conductive pattern 27 is formed on the another surface of this double-sided board.

Thereby, the first antenna element 21 and the first parasitic element 24 are electromagnetically coupled densely through the conductive pattern 27 at the backside of the double-sided board.

(B) Sides at the part where the second antenna element 22 and the second parasitic element 25 are opposed, are not formed in parallel to the Y-axis but are formed obliquely to the Y-axis. Thereby, the size of side length at the opposing part is made large, thus the electromagnetic field coupling becomes dense.

(C) As for the part where the third antenna element 23 and the third parasitic element 26 are opposed, these elements are opposed through a step-like gap. Thereby, the length of the side, where the elements are opposed each other, is extended, thus these elements are electromagnetically coupled densely.

It may be decided which of the above systems of (A), (B) and (C) is to be used or not by considering "the required antenna performance and the given preparing conditions" in the preparing stage.

Figure 8:
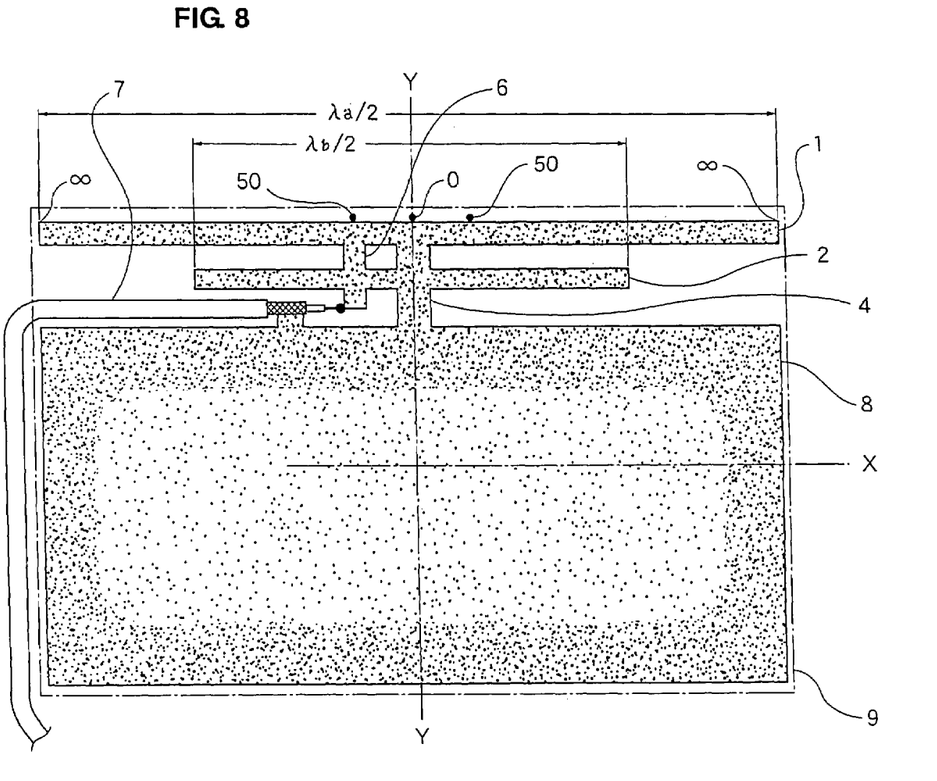
FIG. 8 is a schematic front view drawing examples corresponding to claim 3 and claim 6.

FIG. 8 is the improved type of the example in FIG. 2, and corresponding to claim 3 and claim 6.

This example is constituted in order to transmit and receive the electric waves having the wavelength of $\lambda_a$ and the wavelength of $\lambda_b$, and is the same as the example in FIG. 2 with respect to the object wavelength.

Considering this example totally and schematically, the example in FIG. 8 can be prepared by placing two two-frequency antennas symmetrically with respect to the Y—Y axis, wherein one of them is turned over.

In detail, although the electric length of the first antenna element 21 in FIG. 2 is $\lambda_a/4$, the electric length of the first antenna element 1 in FIG. 8 is $\lambda_a/2$, thus the electric length of the first antenna element 1 in FIG. 8 is exactly twice of that of the first antenna element 21 in FIG. 2.

Although the electric length of the second antenna element 22 in FIG. 2 is $\lambda_b/4$, the electric length of the second antenna element 2 in FIG. 8 is $\lambda_b/2$, thus the electric length of the second antenna element 2 in FIG. 8 is exactly twice of that of the second antenna element 22 in FIG. 2.

As mentioned above, although FIG. 8 has a schematic figure where two of the example in FIG. 2 are symmetrically arranged, only one power feed line 6 is used and one coaxial cable is connected.

When the example in FIG. 8 (claim 3 and claim 6) is compared with the example in FIG. 2 (claim 1 and claim 9), the size of the example in FIG. 8 is about twice of the example in FIG. 2, and the antenna gain is also about twice.

Figure 9:
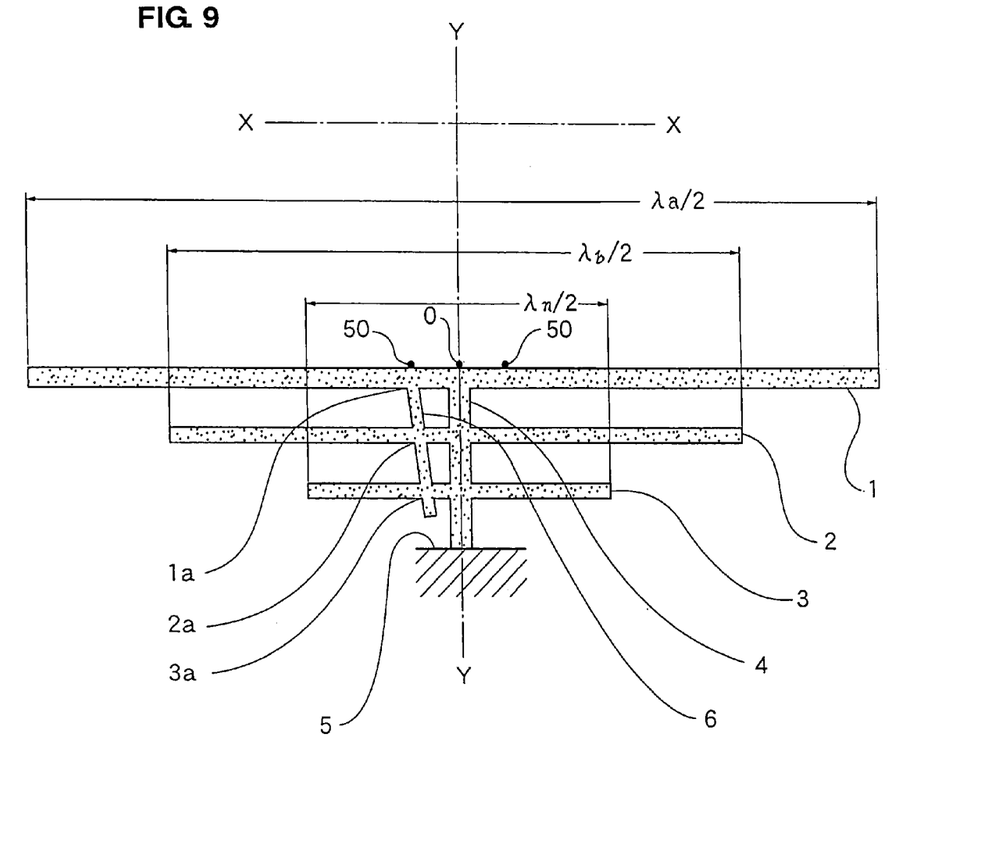
FIG. 9 is a schematic front view drawing an example corresponding to claim 7.

FIG. 9 is the improved type of the example in FIG. 8, and is corresponding to claim 7.

As easily understood by comparing both figures, the electric waves having three kinds of the wavelength can be transmitted and received by adding the n-th antenna element 3 having the electric length of $\lambda_n/2$ into the example shown in FIG. 8.

By the same way, the multi-frequency antenna capable of transmitting and receiving the electric waves having four or five kinds of the wavelength can be constituted.

Figure 10:
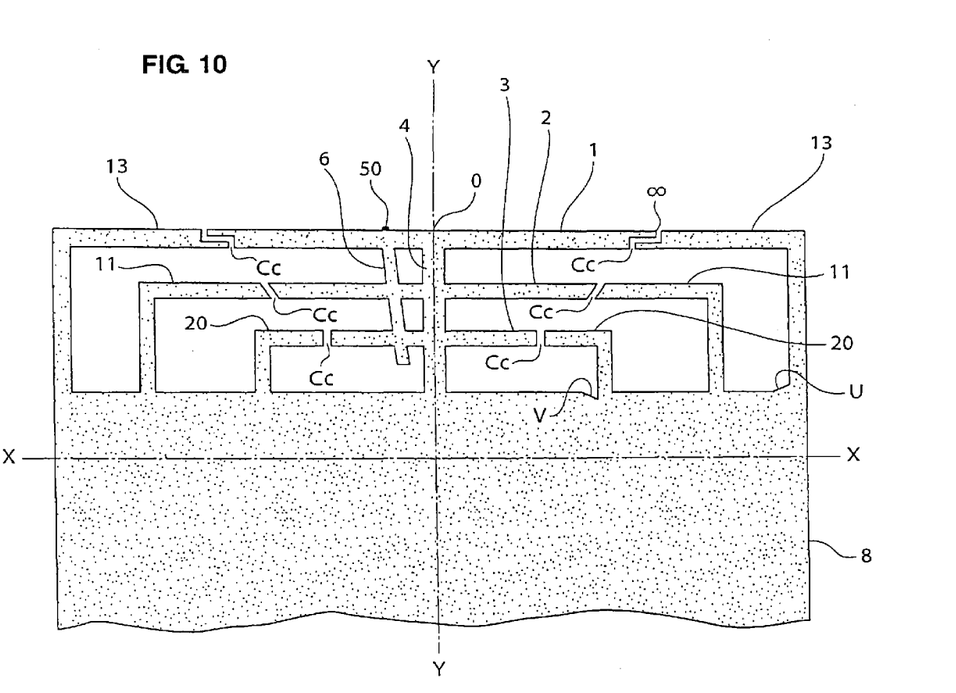
FIG. 10 is a schematic front view drawing examples corresponding to claim 4 and claim 8.

FIG. 10 is the improved example, where the parasitic elements are added into the example in FIG. 9, and is corresponding to claim 8 and claim 12. Moreover, it can be regarded that the example in FIG. 10 is the example, where the above-mentioned examples as in FIG. 7 are symmetrically arranged with respect to the Y-axis.

The first parasitic element 13 is oppositely placed to the first antenna element 1, the second parasitic element 11 is oppositely placed to the second antenna element 2, and the third parasitic element 20 is oppositely placed to the n-th antenna element 3. The tuning frequency band to the electric waves having the three kinds of the wavelength respectively can be expanded by preparing these parasitic elements in this way.

Figure 11:
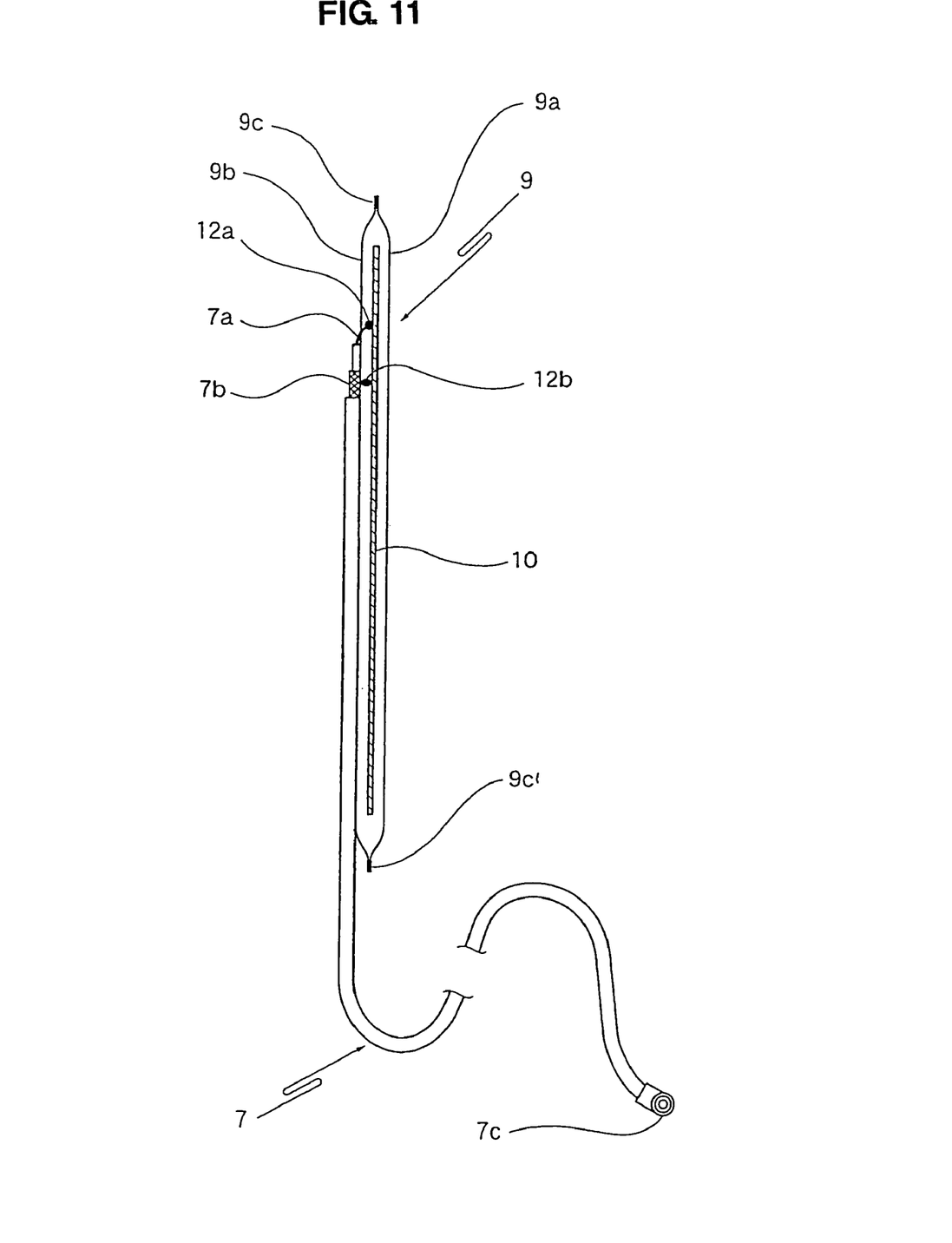
FIG. 11 is a schematic sectional view drawing an example corresponding to claim 13.

FIG. 11 is the sectional view showing the concrete structure for mounting the multi-frequency antenna according to the present invention on the electronic instrument such as the personal computer or the like, and is corresponding to claim 13.

A code 10 shows the conductive constitution member, which is shown by adding the slots in FIG. 2, FIG. 3 and FIG. 7 or FIG. 10 being explained above, and this constitution member is made with the copper thin plate or the flexible board.

A film package 9 is formed by inserting the copper thin plate or flexible board 10 between a film 9a and a film 9b, and welding the periphery (9c) of these plates to be sealed.

The center conductor 7a and the external conductor 7b in the coaxial cable 7 are airtightly penetrated through the film 9b to be soldered (12a, 12b) with the copper thin plate or flexible board 10 respectively. A coaxial connector 7c is equipped with the other end of the coaxial cable 7.

By constituting in this way (FIG. 11), since whole antenna device becomes to have ultra-thin constitution and flexible, this antenna device is suitable for housing in the backside of the liquid crystal display or the inside of the plastic frame, for example, as shown by the code 5 in FIG. 1.

As one typical effect in this case, since the ground plate 8 faces adjacently to "the constitution member of the electronic instrument (for example, an abutment plate at the backside of the liquid crystal display)" through the films 9a or 9b, this plate 8 is connected with the constitution member in high frequency without the special electric wiring. When the ground plate 8 is connected with the abutment plate at the backside of the liquid crystal display in this way, this abutment plate is worked as the ground plate. So, the size of the ground plate 8 being the constitution member of the device of the present invention, can be reduced more than that shown in the drawings.

What is claimed is:

1. A constituting method of a multi-frequency antenna for transmitting and receiving electric waves having the wavelengths of $\lambda_a$ and $\lambda_b$, the method comprising;
    setting an orthogonal coordinate X, Y,
    making the lengthwise direction of a first antenna element (21) having an electric length of $\lambda_a/4$ in parallel to the X axis,
    positioning and arranging one edge in the lengthwise direction of said first antenna element (21) near the Y axis,
    making the lengthwise direction of a second antenna element (22) having an electric length of $\lambda_b/4$ in parallel to the X axis,
    positioning and arranging one edge in the lengthwise direction of said second antenna element (22) near the Y axis,
    connecting electrically a point (0), where an impedance is 0, at the one edge of each of said two antenna elements with a short-circuit line (4) along the Y axis,
    connecting electrically said short-circuit line (4) with a ground plate (8),
    making a point of impedance being 50 Ω (50) of each of said two antenna elements to be a power feed point, and
    connecting electrically a center conductor (7a) of a coaxial cable (7) with said power feed points, while an external conductor (7b) of the coaxial cable is grounded.

2. The constituting method of a multi-frequency antenna according to claim 1, the method comprising;
    placing a first parasitic element (24) having the electric length of $\lambda_a/4$ opposite to and apart from a point of impedance being ∞ at the tip edge of said first antenna element (21), while a base edge of said parasitic element (24) is grounded,
    coupling electromagnetically said first parasitic element (24) with said first antenna element (21), and/or
    placing a second parasitic element (25) having the electric length of $\lambda_b/4$ opposite to and apart from a point of impedance being ∞ at the tip edge of said first antenna element (22), while a base edge of said parasitic element (25) is grounded, and
    coupling electromagnetically said second parasitic element (25) with said second antenna element (22).

3. The constituting method of a multi-frequency antenna according to claim 1, the method comprising;
    using two constitution parts being in a roughly similar shape to a character of F according to claim 1,
    arranging the two F-shaped parts symmetrically with respect to the Y axis, one of said parts being in a turned over shape, and
    arranging a first antenna element (1) having an electric length of $\lambda_a/2$ in parallel to the X axis, and a second antenna element (2) having an electric length of $\lambda_b/2$ in parallel to the X axis.

4. The constituting method of a multi-frequency antenna according to claim 1, the method comprising;
    using two constitution parts being in a roughly similar shape to the character of F according to claim 1,
    arranging the two F-shaped parts symmetrically with respect to the Y axis, one of said parts being in a turned over shape,
    arranging the first antenna element (1) having the electric length of $\lambda_a/2$ in parallel to the X axis, and the second antenna element (2) having the electric length of $\lambda_a/2$ in parallel to the X axis,
    placing a first parasitic element (13) having the electric length of $\lambda_a/2$ opposite to and apart from a part of impedance being of said first antenna element (1) having the electric length of $\lambda_a/2$, and
    coupling electromagnetically said parasitic element (13) with said part of the impedance being ∞, and/or
    placing a second parasitic element (11) having the electric length of $\lambda_b/2$ opposite to and apart from a part of impedance being ∞ of said second antenna element (2) having the electric length of $\lambda_b/2$, and
    coupling electromagnetically said parasitic element (11) with said part of the impedance being ∞.

5. The constituting method of a multi-frequency antenna according to claim 1, the method comprising;
    placing the first parasitic element (24) having the electric length of $\lambda_a/4$ opposite to and apart from the point of impedance being ∞ at the tip edge of said first antenna element (21), while the base edge of said parasitic element (24) is grounded,
    coupling electromagnetically said parasitic element (24) with said point of impedance being ∞, and/or,
    placing the second parasitic element (25) having the electric length of $\lambda_a/4$ opposite to and apart from the point of impedance being ∞ at the tip edge of said first antenna element (22),
    coupling electromagnetically said parasitic element (25) with said point of impedance being ∞, while the base edge of said parasitic element (25) is grounded, and
    forming opposed sides at the part where said two elements are opposite and apart, obliquely with respect to the X axis or in a stepped shape.

6. A multi-frequency antenna for transmitting and receiving electric waves having the wavelengths of $\lambda_a$ and $\lambda_b$, the antenna being constituted by,
    setting the orthogonal X, Y,
    making the lengthwise direction of a first antenna element (1) having an electric length of $\lambda_a/2$ in parallel to the X axis,
    positioning and arranging the center in the lengthwise direction of said first antenna element (1) near the Y axis,
    making the lengthwise direction of a second antenna element (2) having an electric length of $\lambda_b/2$ in parallel to the X axis,
    positioning and arranging the center in the lengthwise direction of said first antenna element (2) near the Y axis,
    connecting electrically a point (0), where the impedance is 0, in the center of each of said two antenna elements with a short-circuit line (4) along the Y axis,
    connecting electrically said short-circuit line (4) with the ground plate (8),
    making a point of impedance being 50 Ω (50) of each of said two antenna elements to be a power feed point, and
    connecting electrically a center conductor (7a) of a coaxial cable (7) with said power feed point, while an external conductor (7b) of the coaxial cable (7) is grounded.

7. The multi-frequency antenna according to claim 6, the antenna being constituted by
  making an n-th antenna element having the electric length of $\lambda_n/2$ in parallel to the first antenna element (1) and the second antenna element (2),
  positioning the center in the lengthwise direction of said n-th antenna (3) near the Y axis, and
  connecting electrically the point of impedance being 50 Ω of said n-th antenna element (3) with a power feed point.

8. The multi-frequency antenna according to claim 6, the antenna being constituted by
  making first parasitic antennas (13) opposite to and apart from both edges of said first antenna element (1),
  connecting electrically the other edges of said first parasitic antennas (13) with the ground plate (8), and/or
  making second parasitic antennas (11) opposite to and apart from both edges of said second antenna element (2), and
  connecting electrically the other edges of said second parasitic antennas (11) with the ground plate (8).

9. A multi-frequency antenna for transmitting and receiving electric waves having the wavelengths of $\lambda_a$ and $\lambda_b$, the antenna being constituted by
  setting the orthogonal coordinate X, Y,
  making the lengthwise direction of a first antenna element (21) having an electric length of $\lambda_a/4$ in parallel to the X axis,
  positioning and arranging one edge in lengthwise direction of said first antenna element (21) near the Y axis,
  making the lengthwise direction of a second antenna element (22) having an electric length of $\lambda_b/4$ in parallel to the X axis,
  positioning and arranging one edge in lengthwise direction of said second antenna element (22) near the Y axis,
  connecting the point (0) with the short-circuit line (4), where the impedance is 0, with a short-circuit line (4) along the Y axis,
  connecting electrically said short-circuit line (4) with the ground plate (8),
  making the point of impedance being 50 Ω (50) of each of said two antenna elements to be a power feed point,
  connecting electrically a center conductor (7a) of a coaxial cable (7) with said power feed point, while an external conductor (7b) of the coaxial cable (7) is grounded.

10. The multi-frequency antenna according to claim 9, the antenna being constituted by
  arranging an third antenna element (23) in parallel to said first antenna element (21) and second antenna element (22), and
  positioning one edge in the lengthwise direction of said third antenna element (23) near the Y axis.

11. The multi-frequency antenna according to claim 9, the antenna being constituted by
  arranging a first parasitic antenna (24) opposite to and apart from the tip edge of said first antenna element (21),
  connecting electrically the other edge of said first parasitic antenna (24) with the ground plate (8), and/or
  arranging a second parasitic antenna (25) opposite to and apart from the tip edge of said second antenna element (22), and
  connecting electrically the other edge of said second parasitic antenna (25) with the ground plate (8).

12. The multi-frequency antenna according to claim 9, the antenna being constituted by
  arranging the first parasitic antenna (24) opposite to and apart from the tip edge of said first antenna element (21),
  connecting electrically the another edge of said first parasitic antenna (24) with the ground plate (8), and/or
  arranging the second parasitic antenna (25) opposite to and apart from the tip edge of said second antenna element (22),
  connecting electrically the other edge of said second parasitic antenna (25) with the ground plate (8), and
  connecting electro-magnetically said antenna elements with said parasitic elements through a conductive pattern (27) formed at a backside of a double-sided board, or
  forming sides at the parts where said antenna elements and said parasitic elements are opposed, in parallel each other and
  obliquely with respect to the X axis.

13. The multi-frequency antenna according to claim 9, the antenna being constituted by
  making the first antenna element (21), second antenna element (22), ground plate (8), short-circuit line (4) and power feed line (6) with a conductive thin plate or flexible board (10), wherein a thin plate or flexible board (10) are inserted between two films (9a, 9b) to be sealed,
  penetrating airtightly the center conductor (7a) of the coaxial cable (7) into said film (9a),
  connecting electrically said center conductor (7a) with said power feed line (6),
  penetrating airtightly the external conductor (7b) of said coaxial cable (7) into said film (9a), and
  connecting electrically said external conductor (7b) with said ground plate (8).

* * * * *